United States Patent [19]

Bass et al.

[11] 4,158,468
[45] Jun. 19, 1979

[54] VEHICLE SAFETY WHEEL

[76] Inventors: Melvin L. Bass, 2262 Kaydel St., Whittier, Calif. 90601; Wesley E. Buford, 1042 Wingate, Covina, Calif. 91723

[21] Appl. No.: 835,634

[22] Filed: Sep. 22, 1977

[51] Int. Cl.² .............................................. B60C 17/00
[52] U.S. Cl. ................................. 301/39 T; 152/410
[58] Field of Search .................... 295/8.5, 9 R, 9 A; 152/152, 167, 208, 220, 397, 398, 405, 406, 409, 410; 301/11 R, 13 R, 14, 27, 28, 35 SS, 35 SL, 38 R, 39 T, 39 C, 40 R, 40 S, 39 R

[56] References Cited

U.S. PATENT DOCUMENTS

| | | | |
|---|---|---|---|
| 2,019,120 | 10/1935 | Cunningham et al. | 301/39 T |
| 2,354,444 | 7/1944 | Lyon | 301/38 R |
| 2,670,994 | 3/1954 | Parrot | 301/39 T |
| 3,397,014 | 8/1968 | Nigrelli | 301/39 T |
| 3,508,790 | 4/1970 | Holmes | 301/39 T |

FOREIGN PATENT DOCUMENTS 511056  8/1939  United Kingdom ................ 301/39 T Primary Examiner—Robert J. Spar
Assistant Examiner—H. Grant Skaggs
Attorney, Agent, or Firm—William P. Green

[57] ABSTRACT

A safety wheel for trucks or other motor vehicles, including a safety flange which is detachably connectable to the tire mounting rim of a wheel body, with the flange having a mounting portion preferably received radially between the rim and a bead of the tire, and with the flange extending generally radially outwardly at the outside of the tire to a peripheral edge which is of a diameter slightly less than the external diameter of the tire to normally be out of engagement with the road surface, but to contact that road surface and effectively support the vehicle in the event of deflation of the tire. The safety flange is desirably retained on the rim by a resilient split retaining ring removably received within an annular groove formed in the wheel body, and with further retention of the safety flange by a series of circularly spaced screws extending outwardly through the wheel body and connecting to the safety flange.

9 Claims, 4 Drawing Figures

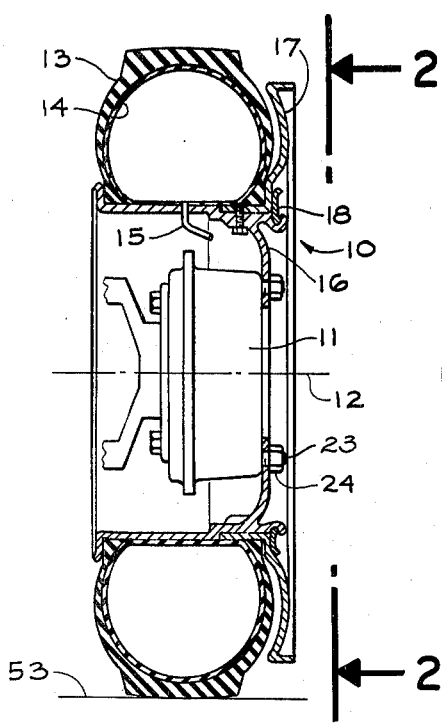
FIG. 1.
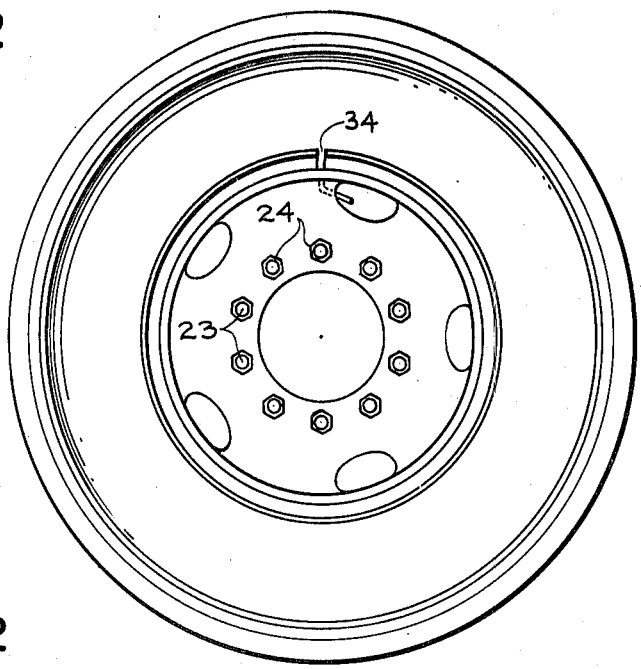
FIG. 2.
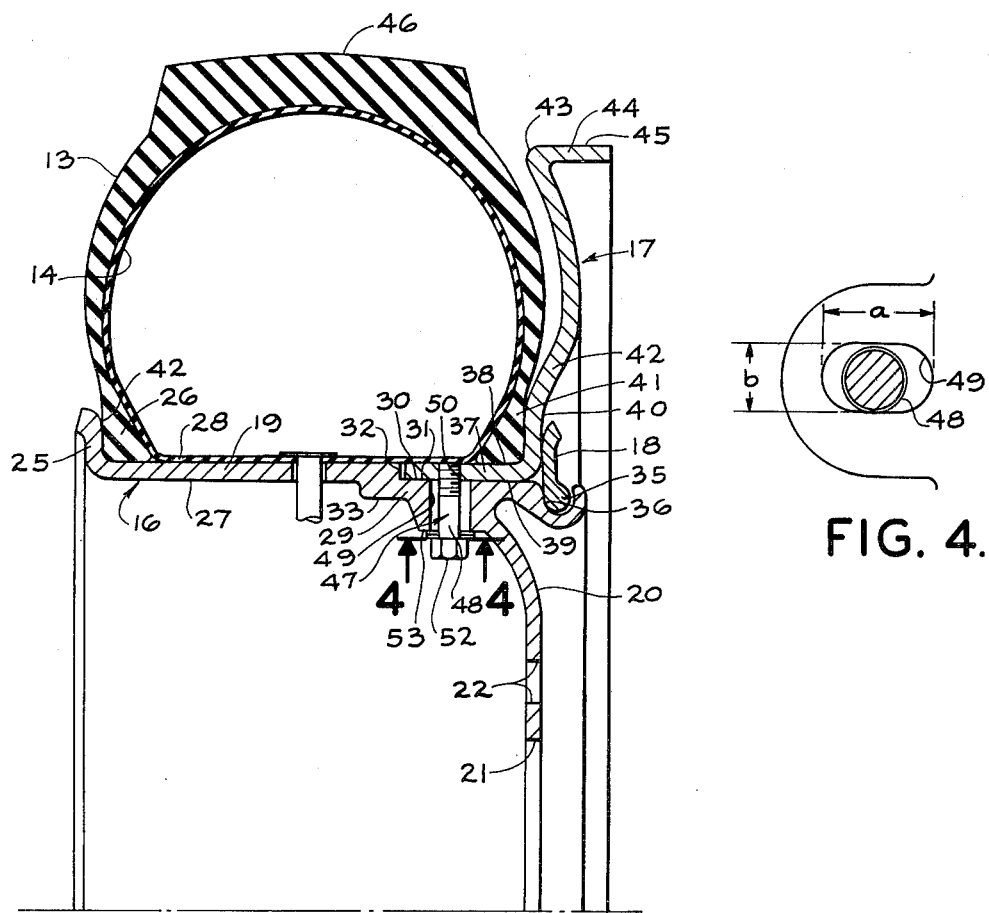
FIG. 3.
FIG. 4.

VEHICLE SAFETY WHEEL

BACKGROUND OF THE INVENTION

This invention relates to improved safety wheels for use on trucks or other heavy motor vehicles, to maintain support for the vehicle if a tire blows outs or for any other reason becomes deflated or under inflated.

Many lives have been lost as the result of the deflation of a tire while a vehicle is traveling at a fairly high rate of speed. Trucks and other very heavy vehicles are especially dangerous in this respect, particularly when the blow out or other tire deflation occurs on the front wheels of the vehicle.

Various attempts have been made in the past to provide secondary support for the vehicle at a wheel location in the case of a blow out or the like. For example, some prior patents have shown rigid elements positioned within an inflatable tire, and adapted to limit the extent to which the tire can deflate and thereby support the vehicle even though all air is lost from the tire. It has also been suggested that a safety flange be attached to the wheel mounting lug bolts by which the wheel is connected to the vehicle, and project outwardly to a peripheral edge of a diameter somewhat less than the external diameter of the tire to engage a road surface when the tire loses inflation.

SUMMARY OF THE INVENTION

A safety wheel embodying the present invention includes a unique safety flange which is detachably connectable to a main body of the wheel at essentially the location of the rim about which the tire is received. From this attachment location, the flange projects generally radially outwardly at the outside of the tire to a peripheral edge which engages the ground surface upon tire deflation. The safety flange is desirably retained on the wheel body by a resilient split retaining ring, which is removably received within an annular groove in the wheel body. The radially inner portion of the safety flange extends inwardly at an axially inner side of the retaining ring, and then desirably has an axially extending annular portion received about and located by the rim. This portion may be secured to the rim by circularly spaced bolts or other fasteners.

BRIEF DESCRIPTION OF THE DRAWING

The above and other features and objects of the invention will be better understood from the following detailed description of the typical embodiment illustrated in accompanying drawings in which:

FIG. 1 is a vertical section through a truck wheel and tire assembly constructed in accordance with the invention;

FIG. 2 is a side elevational view taken on line 2—2 of FIG. 1;

FIG. 3 is an enlarged fragmentary axial section taken in a plane such as that of FIG. 1; and, FIG. 4 is a fragmentary section taken on line 4—4 of FIG. 3.

DESCRIPTION OF THE PREFERRED EMBODIMENT

Referring first to FIG. 1, there is illustrated at 10 a truck wheel assembly which is constructed in accordance with the invention, and which is connected to a conventional brake drum or other hub structure 11 for rotation therewith about a horizontal axis 12. The wheel assembly carries a conventional inflatable truck tire 13, which normally contains an inner tube 14 inflatable through a stem 15.

The wheel assembly 10 includes a main wheel body 16, a safety flange 17, and a retaining ring 18. Body 16 has an outer annular rim portion 19 which is centered about axis 12 and which is integrally connected at one side to an annular mounting flange 20 which extends radially inwardly to an inner edge 21. A series of apertures 22 are formed in mounting flange 20 at evenly circularly spaced locations, and at a common radial distance from the central axis 12, and at locations corresponding to the spacing of the usual threaded lug bolts 23 carried by brake drum or hub 11. As will be understood, these lug bolts 23 extend through apertures 22, so that lug nuts 24 may be tightened on the bolts against flange 20 to rigidly secure the wheel on the brake drum.

Rim portion 19 of the wheel body 16 has a radially outwardly extending annular flange 25 at one of its sides for engaging and retaining a first annular inner bead 26 of the tire 13. Extending rightwardly from the location of this flange 25 as viewed in FIG. 3, rim 19 has a main straight cylindrical portion defined by parallel cylindrical inner and outer surfaces 27 and 28 centered about axis 12, and merging with an annular portion 29 of the rim which is offset radially inwardly to form an annular recess 30 defined by an axially extending annular cylindrical surface 31 centered about axis 12 and of a diameter slightly less than that of surface 28, with a short annular radial surface 32 extending between the surfaces 28 and 31. The radially inner surface 33 of rim 19 at a location radially opposite recess 30 is similarly offset radially inwardly relative to surface 27, to give the rim a substantial thickness across its entire left to right width as seen in FIG. 3.

The retaining ring 18 is similar to the retaining rings currently used on truck tires, and in particular is a split ring having discontinuity at a gap 34 (FIG. 2), so that the ring can be forceably spread to an increased diameter for attachment to and detachment from the wheel body. The annular radially inner edge portion 35 of split ring 18 is removably received within an annular groove 36 formed in a lateral edge portion of the rim, and the ring by its resilience tends to return radially inwardly to the minimum diameter condition illustrated in FIG. 3, in which it is effectively located and retained within groove 30.

The safety flange 17 is a rigid high strength annular part formed of a suitable material, such as steel, having sufficient strength to support the weight of the vehicle at this particular wheel location in the event of deflation of the tire. Flange 17 has a radially inner portion 37 which is annular and extends axially and therefore cylindrically about axis 12, and which is received within annular recess 30 in the wheel body. The outer cylindrical surface 38 of portion 37 of the safety flange is of the same diameter as outer surface 28 of the wheel body, to form in effect a continuation of that outer surface for engagement with the second bead 26 of the tire and the inner tube within the tire. The radially inner cylindrical surface 39 of portion 37 of the safety flange is of a diameter just slightly greater than surface 31 of the wheel body, so that portion 37 can be slipped axially onto portion 29 of the wheel body and into and out of recess 30, but will be a close fit on surface 31 to be retained thereby in properly centered relation with respect to axis 12 and against any substantial shifting movement transversely of that axis. At the right edge of portion 37 as viewed in FIG. 3, the safety flange part 17 extends first radially outwardly at 40 to define a bead retaining portion having a bead engaging surface 41 which is symmetrical with surface 42 of the opposite flange 25. The safety flange 17 then may curve outwardly from the tire at the location 42 of FIG. 3, and continue radially outwardly to the location of a peripheral edge 43 of flange 17, at which an axially extending short cylindrical rim 44 having an outer cylindrical surface 45 centered about axis 12 may be formed. The diameter of this surface 45 with respect to axis 12 is somewhat less than but near to the diameter of the radially outermost portion 46 of the tire, diameter 45 preferably being about two inches (2") less than the diameter at 46.

Flange 17 is retained axially by ring 18, and is also secured to wheel body 16 by a number of circularly spaced threaded fastener or bolts 47, typically ten (10) or more such bolts, whose threaded shanks 48 extend radially outwardly through apertures or passages 49 formed in wheel body 16 and connect into threaded bores 50 formed in portion 37 of the safety flange 17. The heads 52 of these bolts are tightened upwardly against shoulders 53 formed on wheel body 16, and when so tightened the upper extremities of the bolt shanks are desirably received flush with surface 38, or at least preferably do not project radially outwardly beyond that surface. As seen in FIG. 4, each of the passages or apertures 49 through which bolts 47 extend desirably is elongated in a direction parallel to axis 12, to have a dimension a in that direction greater than the diameter of shank 48 of the associated screw 47, to thereby allow limited axial shifting movement of the screws 47 and the connected part 17 in a manner permitting portion 40 of safety flange 17 to be received in direct engagement with split ring 18 and be retained axially thereby. The second dimension b of each slot or passage 49 may be somewhat smaller, and just slightly greater than the diameter of bolt shank 48.

Before mounting the tire 13 on the wheel body, parts 17 and 18 are removed from the wheel body, so that the tire and its contained inner tube 14 can be slipped axially onto the rim from the right side as viewed in FIGS. 1 and 3. The tire and tube are so located while deflated as to allow extension of filling stem 15 through an aperture 51 in the rim. After the tire and inner tube have been thus placed on the rim, safety flange 17 is moved axially (leftwardly in FIGS. 1 and 3) to move its portion 37 into recess 30, following which snap ring 18 is forced onto the rim in spread condition to then constrict radially into groove 36 by virtue of the resilience of the ring. After the parts have been placed on the wheel body 16 in this manner, flange 17 is rotated about axis 12 until threaded openings 50 are directly opposite the corresponding apertures 49. Bolts 47 are then advanced through apertures 49 and screwed partially but not completely into threaded bores 50. In this condition, the flange 17 is still free for limited axial movement relative to wheel body 16, as permitted by the elongation of slots 49 in a direction parallel to axis 12. The inner tube is then inflated to corresponding inflate the tire, and force beads 26 and 27 in opposite directions against surfaces 42 and 41 respectively. The force exerted by the tire bead moves flange 17 rightwardly in FIG. 3 and tightly against the retaining ring 18, so that thereafter all forces exerted rightwardly against part 17 are taken primarily by ring 18. After the tire has been substantially completely inflated, the bolts 47 can be tightened to bring their heads 49 tightly against shoulders 53, so that the bolts assist in retaining the flange rigidly in fixed position relative to wheel body 16. The wheel 16 carrying the inflated tire is then mounted on hub structure 11, by moving the wheel to a position in which lug bolts 23 extend through apertures 22 in mounting flange 20, and by then attaching the lug nuts 24 to bolts 23.

When the truck is in use, the inflated tire 13 contacts road surface 53 (FIG. 1), while the peripheral rim 44 of safety flange 17 being of a smaller diameter is held away from contact with surface 53, being typically spaced about one inch (1") therefrom. In the event of a blow out or other deflation of the tire, the wheel moves downwardly until annular rim 44 engages road surface 53, and thereafter functions as a safety wheel for rolling along the road surface until the vehicle can be brought to a stop or driven to an appropriate tire change location. At that location, the wheel is removed from the vehicle, ring 18 is expanded out of groove 36 and removed from the wheel body, and bolts 47 are removed to allow withdrawal of the safety flange 17 axially off of the rim to thereby free the tire and inner tube for removal. A new tire, or the same tire after repair, can be ultimately mounted on the wheel in the same manner discussed previously.

While a certain specific embodiment of the present invention has been disclosed as typical, the invention is of course not limited to this particular form, but rather is applicable broadly to all such variations as fall within the scope of the appended claims.

We claim:

1. A vehicle safety wheel comprising:
    a wheel body having a rim portion about which an inflatable tire is to be received, and having a mounting flange portion extending generally radially inwardly from said rim portion for connecting the wheel body to a vehicle;
    a safety flange having a portion detachably secured to said body at essentially the location of said rim portion thereof and adjacent to said tire and extending generally radially outwardly at the outside of the tire to a peripheral edge of a diameter slightly less than the external diameter of the tire to engage a road surface and support the vehicle upon deflation of the tire;
    said safety flange having an essentially annular portion extending essentially axially at the outside of said rim portion of said wheel body;
    threaded fasteners extending radially outwardly through said rim portion for securing said flange thereto;
    said wheel containing apertures through which said threaded fasteners extend radially outwardly and which have a dimension axially of the wheel body greater than the corresponding dimension of said fasteners to allow limited axial shifting movement of said safety flange relative to the wheel body; and
    a retaining ring detachably connected to the wheel body axially outwardly of said safety flange to detachably secure the flange on the wheel body.

2. A vehicle safety wheel comprising:
    a wheel body having a rim portion about which an inflatable tire is to be received, and having a mounting flange portion extending generally radially inwardly from said rim portion for connecting the wheel body to a vehicle;
    a safety flange having a portion detachably secured to said body at essentially the location of said rim portion thereof and adjacent to said tire and extending generally radially outwardly at the outside of the tire to a peripheral edge of a diameter slightly less than the external diameter of the tire to engage a road surface and support the vehicle upon deflation of the tire;

said rim portion of the wheel body having a tire retaining flange at one side of the rim for engaging a first bead of the tire;

a split resilient retaining ring removably received in an annular groove formed in said wheel body at the opposite side of the rim portion for retaining a second bead of the tire;

said safety flange having a mounting portion extending generally radially inwardly at a location axially inwardly of said retaining ring and axially between said ring and said second bead of the tire, and then extending axially at the radially inner side of the tire and within an annular recess formed in said rim portion of the wheel body; and a plurality of circularly spaced screws extending radially outwardly through apertures in said rim and portion threadedly connected to said axially extending portion of said mounting portion of the safety flange;

said apertures having a dimension axially of the wheel which is slightly greater than the corresponding dimension of said screws;

said mounting flange portion of the wheel body containing apertures spaced inwardly from the rim portion of the wheel body and inwardly of said safety flange and said retaining ring for securing the wheel body to a vehicle.

3. A vehicle safety wheel comprising:

a wheel body having a rim portion about which an inflatable tire is to be received, and having a mounting flange portion extending generally radially inwardly from said rim portion for connecting the wheel body to a vehicle;

a safety flange detachably secured to said body and extending generally radially outwardly at a side of the tire to a peripheral edge of a diameter slightly less than the external diameter of the tire to engage a road surface and support the vehicle upon deflation of the tire;

said safety flange having a bead retaining portion near the rim portion of the wheel body which extends generally radially adjacent the tire and engages a bead of the tire in an abutting relation retaining that bead against axial expanding movement;

said safety flange having an additional portion rigidly connected to an inner edge of said generally radially extending bead retaining portion and turned to extend generally axially at a radially inner side of said bead of the tire and radially between that bead and an outer surface of said rim portion of the wheel body; and a resilient retaining ring formed separately from said safety flange and receivable within a groove in said rim portion of the wheel body and engageable with an outer side of said bead retaining portion of the safety flange in a relation blocking axial movement thereof.

4. A vehicle safety wheel as recited in claim 3, including fastener means extending radially outwardly through said rim portion of the wheel body and connected to said additional axially turned portion of the safety flange.

5. A vehicle safety wheel as recited in claim 3, including a plurality of screws extending radially outwardly through apertures formed in said rim portion of the wheel body and threadedly connected to said axially turned additional portion of the safety flange.

6. A vehicle safety wheel as recited in claim 5, in which said rim portion of the wheel body has a radially outwardly turned shoulder formed integrally therewith at an axially inner side of the tire for engaging and retaining a second bead of the tire.

7. A vehicle safety wheel as recited in claim 3, in which said rim portion of the wheel body has a radially outwardly turned shoulder formed integrally therewith at an axially inner side of the tire for engaging and retaining a second bead of the tire.

8. A vehicle safety wheel as recited in claim 3, in which said bead retaining portion of the safety flange extends substantially directly radially, and said additional axially turned portion of the safety flange extends substantially cylindrically and as viewed in axial section is substantially perpendicular to said bead retaining portion.

9. A vehicle safety wheel as recited in claim 3, in which said rim portion of the wheel body has a radially outer essentially cylindrical surface and contains an annular recess within which said axially turned portion of the safety flange is received, said axially turned portion having an outer essentially cylindrical surface essentially aligned axially with said outer surface of the rim portion.

* * * * *